US008869562B2

(12) United States Patent
Kawahata et al.

(10) Patent No.: US 8,869,562 B2
(45) Date of Patent: Oct. 28, 2014

(54) GLASS FORMING APPARATUS

(71) Applicants: Makoto Kawahata, Shizuoka (JP); Yuko Takeuchi, Shizuoka (JP); Masaaki Tanaka, Shizuoka (JP); Makoto Taniyama, Shizuoka (JP)

(72) Inventors: Makoto Kawahata, Shizuoka (JP); Yuko Takeuchi, Shizuoka (JP); Masaaki Tanaka, Shizuoka (JP); Makoto Taniyama, Shizuoka (JP)

(73) Assignee: Corning Incorporated, Corning, NY (US)

(*) Notice: Subject to any disclaimer, the term of this patent is extended or adjusted under 35 U.S.C. 154(b) by 184 days.

(21) Appl. No.: 13/689,287

(22) Filed: Nov. 29, 2012

(65) Prior Publication Data

US 2014/0144187 A1      May 29, 2014

(51) Int. Cl.
    *C03B 17/06* (2006.01)
(52) U.S. Cl.
    CPC ................... *C03B 17/064* (2013.01)
    USPC ............................................. 65/168; 65/186
(58) Field of Classification Search
    CPC ...... C03B 17/00; C03B 17/06; C03B 17/064; C03B 17/067
    USPC .............................................. 65/27, 168, 186
    See application file for complete search history.

(56) References Cited

U.S. PATENT DOCUMENTS

| 1,731,260 | A | * | 10/1929 | Nobbe ................................ 65/53 |
| 3,682,609 | A | | 8/1972 | Dockerty et al. |
| 2004/0154336 | A1 | | 8/2004 | Pitbladdo |
| 2009/0100873 | A1 | * | 4/2009 | Allan et al. ......................... 65/85 |
| 2010/0031702 | A1 | | 2/2010 | Tomamoto et al. |
| 2012/0159990 | A1 | | 6/2012 | Tsuda et al. |
| 2012/0216575 | A1 | | 8/2012 | Delia et al. |

FOREIGN PATENT DOCUMENTS

JP       2009-137784       6/2009       ............ C03B 17/04

OTHER PUBLICATIONS

PCT—form PCT/ISA/220—Notification of Transmittal of the International Search Report and the Written Opinion of the International Searching Authority, or the Declaration—Dated Mar. 12, 2014.

* cited by examiner

*Primary Examiner* — Matthew Daniels
*Assistant Examiner* — Cynthia Szewczyk
(74) *Attorney, Agent, or Firm* — Kevin M. Able (57) ABSTRACT

Forming defects and cracks caused by agglomerated glass components are prevented in a glass forming apparatus, such as a fusion draw glass forming apparatus. The glass forming apparatus has first peripheral walls; a forming member to form the glass into sheet form; second peripheral walls provided beneath the first peripheral walls with an interval therebetween; rollers provided within the second peripheral walls for drawing the glass in sheet form downward; partitioning plates for adjusting the temperature of the space; box shaped trays having open portions; and a tray holding mechanism that enables the trays to enter and exit the interval and that hold the trays such that the open portions of the trays extend along the distal ends of the partitioning plates at a position under the partitioning plates when the trays are within the interval.

19 Claims, 7 Drawing Sheets

GLASS FORMING APPARATUS

FIELD

The present invention is related to a glass forming apparatus. The present invention is particularly related to a glass forming apparatus that causes molten glass to flow downward along a forming member, to form the glass into sheet form.

BACKGROUND

A so called fusion draw machine is an example of a conventionally known apparatus for forming glass in sheet form. The fusion draw machine causes molten glass to flow downward along a forming member to produce a glass ribbon having a predetermined thickness. Individual glass sheets may be cut from the glass ribbon A more specific example of a known glass forming apparatus of this type is that which is equipped with first peripheral walls that define an inner forming space for forming molten glass into sheet form by surrounding the lateral periphery of the space and having a lower opening at the lower end thereof; a forming means such as a forming member for causing the molten glass to flow downward to form the molten glass into a glass ribbon, provided within the inner forming space; second peripheral walls provided under the first peripheral walls with an interval therebetween that define an inner space for receiving the glass ribbon by surrounding the lateral periphery of the space and having an upper opening through which the glass ribbon passes; and a pair of rollers provided within the second peripheral walls for pinching and drawing the glass ribbon downward.

In a glass forming apparatus having the configuration described above, there are cases in which volatilized components of the molten glass agglomerate on the interiors of the first peripheral walls, into which the molten glass is supplied from the exterior. The agglomerated volatilized components may travel along the inner surfaces of the first peripheral walls as droplets, and drop therefrom. Problems such as formation defects and cracks in the glass ribbon may occur if the agglomerated glass components drop between the glass ribbon and the pair of rollers and are sandwiched therebetween.

Generally, partitioning plates for adjusting the temperatures within the first peripheral walls are provided above the pair of rollers in a glass forming apparatus. There are cases in which the droplets of agglomerated glass travel along the inner surfaces of the first peripheral walls, reach the partitioning plates, travel along the partitioning plates, then drop. It is possible to scrape the agglomerated glass from the surface of the partitioning plates with a rod shaped cleaning member by inserting a cleaning member through the interval between the first peripheral walls and the second peripheral walls.

However, the efficiency of inserting and operating the cleaning member within the narrow interval is extremely poor. In addition, there are cases in which new formation defects or cracks are generated by the cleaning member or by droplets falling during the cleaning operation while performing the difficult task of operating the cleaning member within the narrow interval. Such falling of droplets is unpredictable, and it had conventionally been necessary to constantly monitor the cleaning operation.

SUMMARY

The present invention has been developed in view of the foregoing circumstances. Accordingly, a glass forming device is described that can efficiently collect agglomerated glass components to prevent deformation defects and cracks in a glass ribbon caused by the agglomerated glass components.

In one embodiment, a first glass forming apparatus is described comprising first peripheral walls that define an inner forming space for forming molten glass into a glass ribbon by surrounding the lateral periphery of the space and having a lower opening at the lower end thereof; a forming means for causing the molten glass to flow downward to form the molten glass into a glass ribbon, provided within the inner forming space; second peripheral walls provided under the first peripheral walls with an interval therebetween that define an inner space for receiving the glass ribbon by surrounding the lateral periphery of the space and having an upper opening through which the glass ribbon passes; a pair of rollers provided within the second peripheral walls for pinching and drawing the glass ribbon downward; and partitioning plates having base ends fixed to the inner surfaces of the first peripheral walls and distal ends positioned lower than the base ends, for adjusting the temperature within the inner forming space. The apparatus may further comprise box shaped trays having open portions; and a tray holding mechanism that enables the trays to enter and exit the interval, that holds the trays such that they are positioned under the distal ends of the partitioning plates and extend along the distal ends when the trays are within the interval.

The tray holding mechanism may comprise portions that include the surfaces of the upper edges of the second peripheral walls.

In another embodiment a second glass forming apparatus is described comprising first peripheral walls that define an inner forming space for forming molten glass into a glass ribbon by surrounding the lateral periphery of the space and having a lower opening at the lower end thereof; a forming means for causing the molten glass to flow downward to form the molten glass into a glass ribbon, provided within the inner forming space second peripheral walls provided under the first peripheral walls with an interval therebetween that define an inner space for receiving the glass ribbon by surrounding the lateral periphery of the space and having an upper opening through which the glass ribbon passes; a pair of rollers provided within the second peripheral walls for pinching and drawing the glass ribbon downward; and partitioning plates having base ends fixed to the inner surfaces of the first peripheral walls and distal ends positioned lower than the base ends, for adjusting the temperature within the inner forming space; and may further comprise: a cutout that communicates the interior and the exterior of the second peripheral walls, formed in the second peripheral walls at positions above the pair of rollers; box shaped trays having open portions; and a tray holding mechanism that enables the trays to enter and exit the second peripheral walls through the cutout in a state in which the open portions of the trays are oriented to face horizontal directions, that enables the trays to be rotated until the open portions are oriented to face upward after the trays enter the second peripheral walls, and that holds the trays such that they are positioned under the distal ends of the partitioning plates and extend along the distal ends after the rotation. The tray holding mechanism may comprise: rods, to which one of the ends of the trays is fixed, that extend in a direction parallel to the distal ends of the partitioning plates; and a mount having portions that hold the rods in a rotatable manner and portions that extend in the vertical directions with apertures through which the trays pass formed therein, and further for the tray holding mechanism to comprise handles for rotating the rods.

In still another embodiment a glass forming apparatus is disclosed comprising: first peripheral walls that define an inner forming space for forming molten glass into a glass ribbon by surrounding the lateral periphery of the space and having a lower opening at the lower end thereof; a forming means for causing the molten glass to flow downward to form the molten glass into a glass ribbon, provided within the inner forming space; second peripheral walls provided under the first peripheral walls with an interval therebetween that define an inner space for receiving the glass ribbon by surrounding the lateral periphery of the space and having an upper opening through which the glass ribbon passes; a pair of rollers provided within the second peripheral walls for pinching and drawing the glass ribbon downward; and partitioning plates having base ends fixed to the inner surfaces of the first peripheral walls and distal ends positioned lower than the base ends, for adjusting the temperature within the inner forming space; and may further comprise: a cutout that communicates the interior and the exterior of the second peripheral walls, formed in the second peripheral walls at positions above the pair of rollers; box shaped trays having open portions; and a tray holding mechanism that enables the trays to enter and exit the second peripheral walls through the cutout, that holds the trays such that they are positioned under the distal ends of the partitioning plates and extend along the distal ends after the rotation.

The tray holding mechanism may comprise a portion that includes an upward facing surface of the second peripheral walls, which is the lower edge of the cutout.

The trays may be U shaped in cross section. In addition, the lengths of the open portions of the trays may be greater than or equal to the widths of the distal ends of the partitioning plates in the horizontal direction.

Further, the partitioning plates may be formed in a state in which they extend in the width direction of the glass ribbon at both sides of the glass ribbon. Two of the trays may be provided, for example, each corresponding to one of the two partitioning plates.

Embodiments described within the present disclosure may be applied, for example, to a fusion draw glass forming apparatus.

Embodiments of the glass forming apparatuses described herein are all equipped with box shaped trays having open portions provided at positions above the pairs of rollers such that the open portions extend along the distal ends of the partitioning plates beneath the distal ends. Therefore, the agglomerated glass components that drop from the distal ends of the partitioning plates can be received in the trays. The agglomerated glass components will not drop between the glass which is being formed into sheet form and the pairs of rollers, by the agglomerated glass components being received in the trays. Therefore, problems such as the aforementioned forming defects and cracks in the glass ribbon being generated can be positively prevented.

The trays may, for example, be capable of being drawn outward through the interval between the first peripheral walls and the second peripheral walls. Alternatively, the trays may be capable of being drawn outward from the interiors of the second peripheral walls. Therefore, if a large amount of the agglomerated glass components accumulate within the trays, the trays can be drawn outward as appropriate, and the accumulated agglomerated glass components can be collected efficiently and in a simple manner.

DETAILED DESCRIPTION

Figure 1:
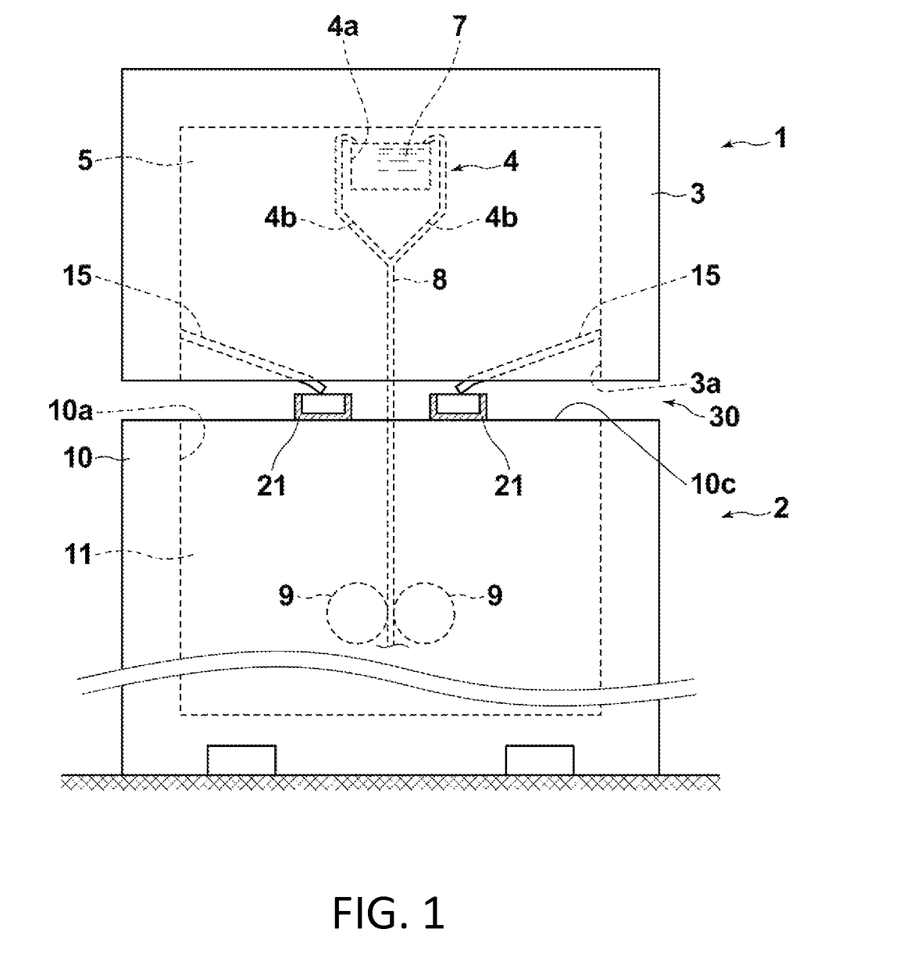
FIG. 1 is a partially cross sectional front view that illustrates a glass forming apparatus according to a first embodiment of the present invention.
Figure 2:
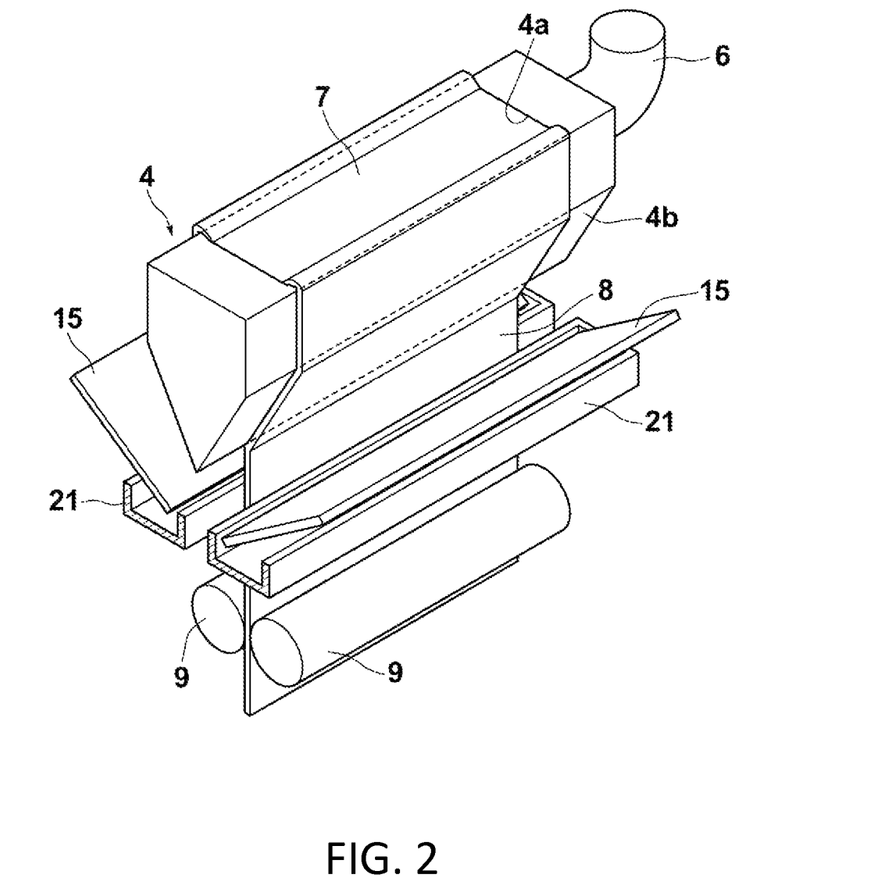
FIG. 2 is a perspective view that illustrates a portion related to glass formation of the glass forming apparatus of FIG. 1.
Figure 3:
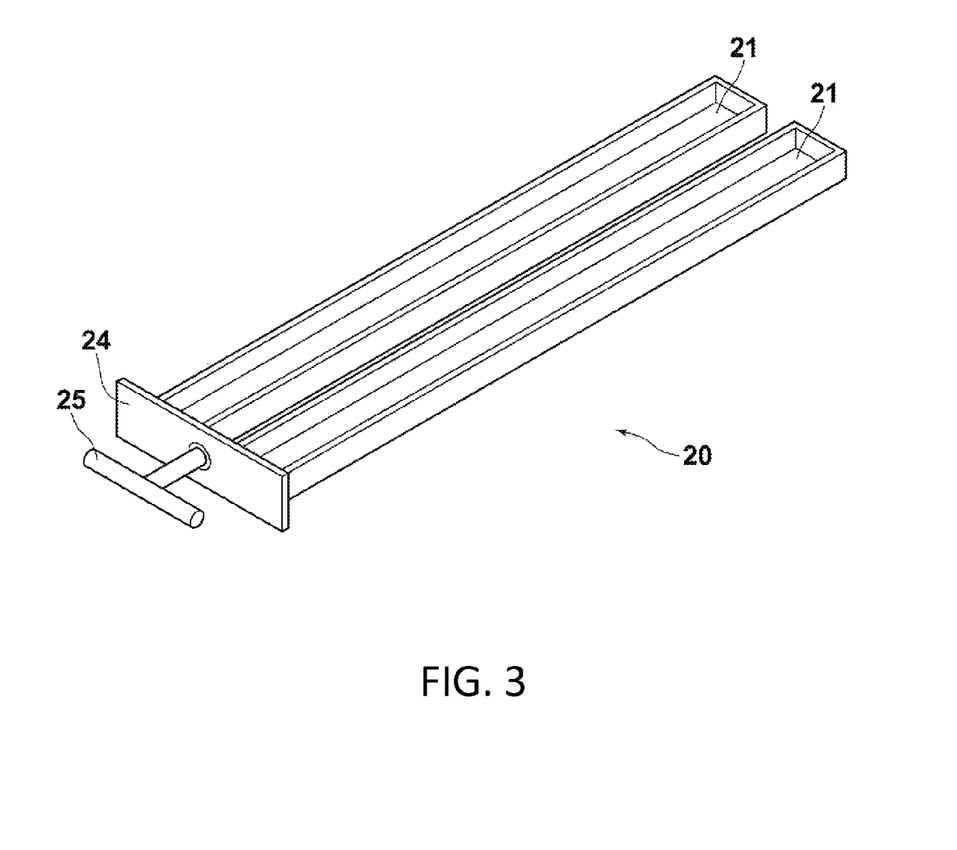
FIG. 3 is a perspective view that illustrates a tray holding mechanism of the glass forming apparatus of the FIG. 1.

Hereinafter, embodiments of the present invention will be described in detail with reference to the attached drawings. FIG. 1 is a partially cross sectional front view of a glass forming apparatus according to a first embodiment of the present invention. FIG. 2 and FIG. 3 are perspective views that illustrate a portion related to glass formation of the glass forming apparatus and a portion related to collection of agglomerated glass components of the glass forming apparatus, respectively.

The glass forming apparatus of the first embodiment is a so called fusion draw machine, and comprises: a first cooling section 1; and a second cooling section 2 provided below the first cooling section 1, as illustrated in FIG. 1. The first cooling section 1 comprises a forming means 4 provided within first peripheral walls 3. The first peripheral walls 3 are formed by thermally insulative members that define an inner forming space 5 having four sealed peripheral surfaces. The first peripheral walls 3 seal the top of the inner forming space 5, and have a lower opening 3a at the bottom of the inner forming space 5. Meanwhile, the second cooling section 2 has second peripheral walls 10 with an upper opening 10a aligned with the lower opening 3a. The second peripheral walls 10 define an inner space 11 having four sealed peripheral surfaces and a sealed bottom surface.

The interiors of the first peripheral walls 3 and the second peripheral walls are respectively maintained at predetermined temperatures by heating means and temperature adjusting means (not shown).

FIG. 2 illustrates forming body 4 and peripheral portions thereof. As illustrated in FIG. 2, forming body 4 comprises an open top having a trough 4a and two converging flow surfaces, that is, convergent forming surfaces 4b. Molten glass 7 is supplied to the trough 4a from a supply opening 6 from a source of molten glass (not shown). The molten glass 7 overflows the upper lateral edges of the trough 4a, and flows down toward the converging forming surfaces 4b as two separated flows of molten glass. The flows of molten glass 7 recombine with each other at the bottom edge of forming body 4, at which the converging forming surfaces 4b intersect, and become a glass ribbon 8 having pristine outer surfaces. The glass ribbon 8 passes through the lower opening 3a of the first peripheral walls 3, and is drawn downward by a pair of pulling rollers 9 provided within the second peripheral walls 10 of the second cooling section 2. Thereafter, the glass ribbon 8 is cooled within the second cooling section 2 to a desired viscosity and temperature, and then cut into sheets of predetermined sizes.

Note that a detailed description of the specifics of the forming body 4 will be omitted. However, a fusion glass producing process that employs such a forming body is described in detail in the specification of U.S. Pat. No. 3,338, 696, for example. A known production technique such as that described herein may be applied to embodiment of the present disclosure.

In this type of fusion draw machine, components that volatilize from the molten glass 7 are released within the inner forming space 5 and agglomerate. There are cases in which the agglomerated glass components become droplets that travel along the inner surfaces of the first peripheral walls 3 and drop therefrom. Problems such as formation defects and cracks in the glass ribbon may occur if the agglomerated glass components drop between the glass ribbon and the pair of pulling rollers and are sandwiched therebetween.

Hereinafter, a configuration for preventing the occurrence of such problems will be described. The base ends of partitioning plates 15 for adjusting the temperature within the inner forming space 5 are fixed on the two side walls from among the four surfaces of the first peripheral walls 3. Each of the partitioning plates 15 are formed as a rectangle of which the distal end extends along the width direction of the glass ribbon and is mounted in an inclined manner such that the distal ends are positioned below the base end. The widths of the partitioning plates 15 are equal to or slightly greater than the width of the glass ribbon 8. Note that the partitioning plates 15 may be of configurations which are swingable so as to change the angles of inclination thereof.

Two trays 21, which are supported by a tray holding mechanism, to be described later, are provided at positions beneath the distal ends of the two partitioning plates 15. Each of the trays 21 is an elongate box having a U shaped cross section and sealed front and rear ends. The lengths of the open top portions of the trays 21 are greater than or equal to the width of the distal ends of the partitioning plates 15. The trays 21 are caused to enter an interval 30 between the first peripheral walls 3 and the second peripheral walls 10 such that the open portions thereof extend along the distal ends of the partitioning plates 15 at positions slightly beneath the distal ends of the partitioning plates 15.

When the aforementioned droplets of agglomerated glass components travels along the inner surfaces of the first peripheral walls 3 and along the partitioning plates 15, then drop from the distal ends thereof, they fall into the trays 21 and are captured thereby. Accordingly, the agglomerated glass components will not fall between the glass ribbon 8 which is being formed and the pulling rollers 9 to become sandwiched therebetween. Thereby, the occurrence of problems such as formation defects and cracks in the glass ribbon 8 can be positively prevented.

Note that the trays 21 may be formed by a material having high heat resistance. Examples of materials that exhibit stable performance in high temperature ranges include: Haynes Alloy™; stainless steel SUS 310, and ceramics.

In addition, the trays 21 are configured to be movable between a utilization position, at which the agglomerated glass components can be received as described above, and a retreated position, in which the trays 21 are outside the interval 30. Thereby, when a large amount of the agglomerated glass components is accumulated within the trays 21, the trays 21 can be drawn out from the interval 30, and the accumulated agglomerated glass components can be removed. The configuration that enables the removal will be described with reference also to FIG. 3.

FIG. 3 illustrates a portion of a tray holding mechanism 20 that holds the two trays 21. As illustrated in FIG. 3, the tray holding mechanism 20 has a fixing member 24, to which one of the ends of the two trays 21 are fixed, and a handle 25 mounted on the fixing member. In the first embodiment, an operator holds the handle 25 to move the two trays 21 to place them at an appropriate position on the upper end surface 10c (refer to FIG. 1) of the second peripheral walls 10. Note that the leading ends of each of the trays 21 are held on the upper end surface 10c of the second peripheral walls 10 at the side opposite that at which the trays 21 are inserted (that is, the side toward the back in FIG. 1).

As described above the tray holding mechanism 20 of the first embodiment is constituted by the portions of the upper end surface 10c of the second peripheral walls 10 that receive the trays 21 thereon, the fixing member 24, and the handle 25.

Note that it is not necessary for the two trays 21 to be linked by the fixing member 24 in the manner described above, and each of the trays 21 may be operated individually. Further, separate tray holding mechanisms provided on the peripheral walls 3 or 10 may hold the trays 21 instead of the upper end surfaces 10c of the second peripheral walls 10.

Note that in FIG. 1 and FIG. 2, the trays 21 are illustrated such that they are cut off at the portion near the fixing member 24, and the fixing member 24 and the handle 25 continuing therefrom are omitted.

The operator can draw a large portion of the two trays 21 out toward the exterior (the left direction in FIG. 3) through the interval 30. In this state, the agglomerated glass components which have accumulated in the trays 21 can be removed in a simple manner.

Note that in the first embodiment, the lengths of the open top portions of the trays 21 having the U shaped cross section are greater than or equal to the widths of the distal ends of the partitioning plates 15. Alternatively, in the case that guides for guiding agglomerated glass components toward only portions of the distal ends are provided on the partitioning plates 15, the lengths of the open top portions of the trays 21 may be sufficient to receive the agglomerated glass components that drop from the aforementioned portions. This applies to the embodiments to be described later as well.

Next, another embodiment will be described with reference to FIGS. 4 through 6. Note that in FIG. 4 through 6, elements which are equivalent to those illustrated in FIGS. 1 through 3 are denoted with the same reference numerals, and detailed descriptions thereof will be omitted insofar as they are not particularly necessary.

Figure 4:
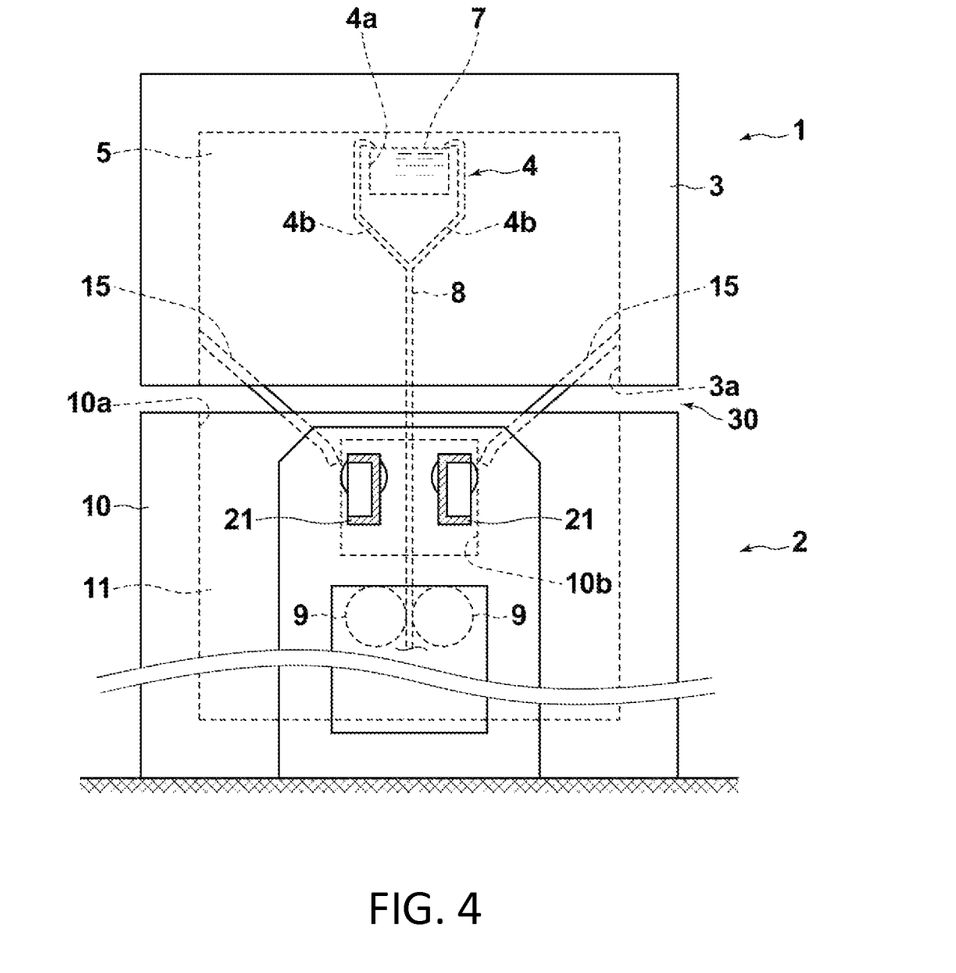
FIG. 4 is a partially cross sectional front view that illustrates a glass forming apparatus according to a second embodiment of the present invention.

FIG. 4 is a partially cross sectional front view that illustrates a glass forming apparatus according to the second embodiment of the present invention. FIG. 5 is a perspective view that illustrates a portion related to collection of agglomerated glass components of the glass forming apparatus of FIG. 4. FIG. 6 is a schematic diagram for explaining the operation of the trays 21 of the glass forming apparatus of FIG. 4. The apparatus of the present embodiment basically differs from that of the apparatus of the embodiment described above in respect of a tray holding mechanism 40 illustrated in FIG. 5. In addition, the configuration related to glass formation in the apparatus of the present embodiment is the same as that in the apparatus of the previous embodiment. That is, a forming body having the same configuration as that illustrated in FIG. 2 is employed.

Figure 5:
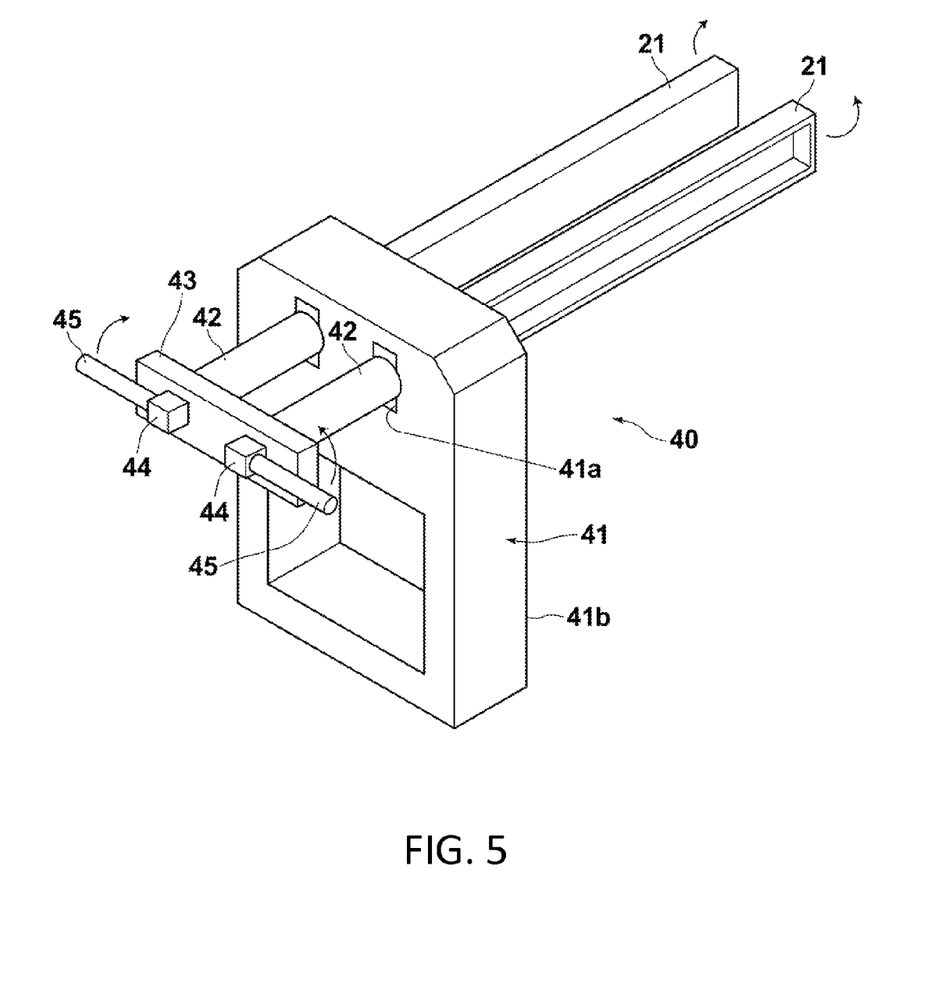
FIG. 5 is a perspective view that illustrates a tray holding mechanism of the glass forming apparatus of FIG. 4.

The tray holding mechanism 40 illustrated in FIG. 5 includes: a mount 41 having two apertures 41a therein; two rods 42, each of which is inserted through the apertures 41a and has one of the trays 21 fixed to the distal end thereof; a rod fixing plate 43 having circular apertures (not shown) in which thin diameter rear end portions of the rods 42 are inserted and held; two rotating sections 44 fixed to the rear end portions of the rods 42; and two handles 45 each of which are fixed to one of the rotating sections 44, respectively.

The apertures 41a have circular portions through which the cylindrical rods 42 pass through, and rectangular portions that extend above and below the circular portions that allow the trays 21 to pass therethrough. Accordingly, each of the trays 21 having the U shaped cross section can be passed through the apertures 41a in a vertically oriented state in which the open portions thereof face the exteriors in the horizontal direction from a leading end side thereof (toward the right in FIG. 5). After the trays 21 pass completely through the apertures 41a, the rods 42 are held within the circular portions of the apertures 41a in a rotatable manner.

The mount 41 is moved to a position at which an inner surface 41b thereof (the surface toward the side from which the trays 21 protrude) is in close contact with the outer surface of the second peripheral walls 10, and fixed in this state. As illustrated in FIGS. 4 and 6, a cutout 10b that communicates with the interior and the exterior of the second peripheral walls 10 is formed in one of the second peripheral walls 10 at a position that corresponds to the apertures 41a, above the pulling rollers 9. In the present example the cutout 10b is of a shape which is greater than the sizes of the two apertures 41a. Alternatively, two small cutouts having shapes that match the shapes of the apertures 41a may be provided. Note that in FIG. 4, the trays 21 are illustrated such that they are cut off at the portion near the rods 42, and the rods 42, the rod holding plate 43, the rotating sections 44 and the handles 45 continuing therefrom are omitted.

Figure 6:
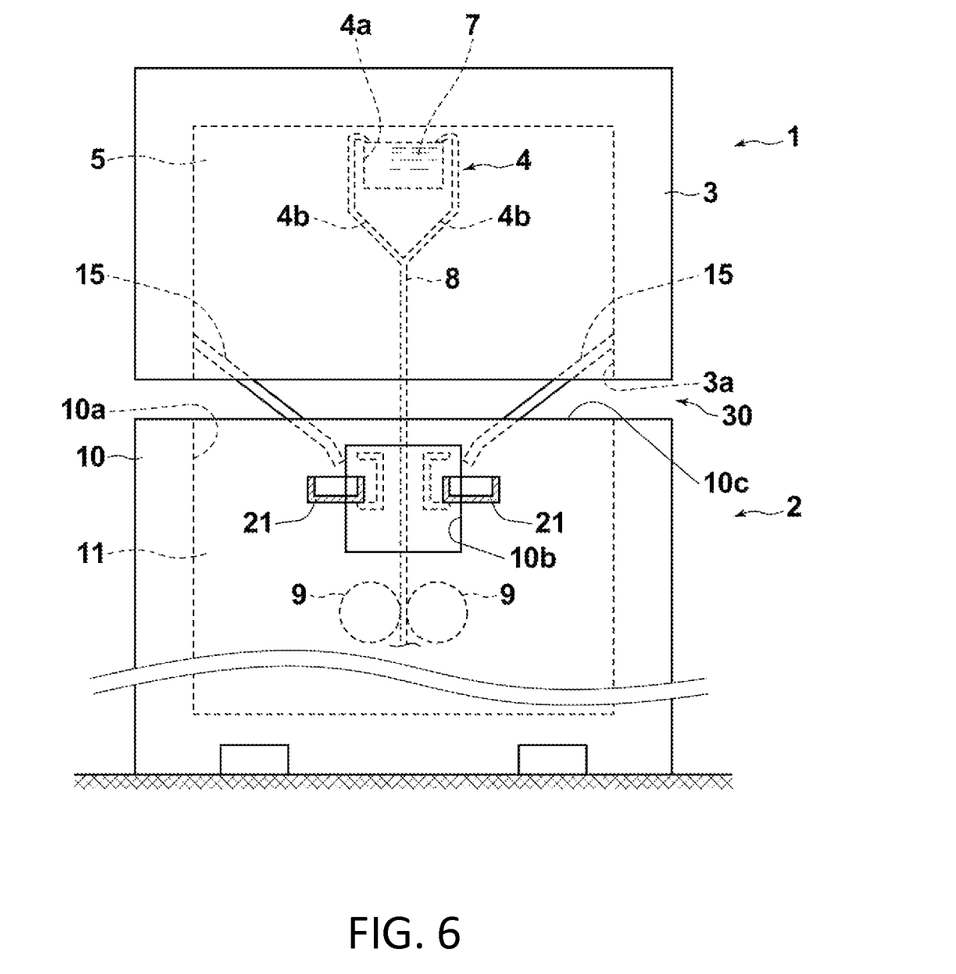
FIG. 6 is a schematic diagram for explaining the operation of trays of the glass forming apparatus of FIG. 4.

There are cases in which the distal ends of the partitioning plates 15, which are fixed to the inner surfaces of the first peripheral walls, deform to bend downward as illustrated in FIGS. 4 and 6, accompanying repeated use of the glass forming apparatus. In addition, there are cases in which the partitioning plates 15 are damaged by a cleaning member when performing operations that employ the cleaning member and deform as a result. In the case that the distal ends of the partitioning plates 15 reach a position beneath the interval 30 between the first peripheral walls 3 and the second peripheral walls, the apparatus of the preceding embodiment that inserts the trays 21 into the interval 30 will not be able to insert the trays 21 to their utilization positions because the partitioning plates 15 will interfere with the bottoms of the trays 21. In addition, it is difficult to confirm the positions of the distal ends of the partitioning plate 15 even if it is attempted to observe the states of the partitioning plates 15 through the interval 30.

The glass forming apparatus of the present embodiment is configured to deal with the aforementioned problems. That is, the two trays are passed through the apertures 41a of the mount 41 in the vertically oriented state to enter the interior of the second peripheral walls 10 through the cutout 10b. Thereby, the trays 21 can be inserted to their ultimate positions without interfering with the partitioning plates 15. Note that in FIG. 6, the trays 21 in the vertically oriented state are denoted by broken lines, and the trays 21 following rotation to be described later are denoted by hatching.

Note that the trays 21 having the U shaped cross section are formed such that the dimensions in the depth direction (the horizontal direction in FIG. 4) thereof are smaller than the dimensions in the width direction (the vertical direction in FIG. 4) thereof.

After the trays 21 are inserted to their ultimate positions, the handles 45 illustrated in FIG. 5 are rotated. When the handle 45 on the right is rotated counterclockwise for 90° and the handle 45 on the left is rotated clockwise for 90°, each of the trays 21 also rotate coupled with the rotation of the handles 45. In this state, the trays 21 having the U shaped cross sections are oriented such that the open portions face upward and such that they are positioned under the distal ends of the partitioning plates 15 and extend along the distal ends (a state in which they are in the utilization position). Therefore, it becomes possible for agglomerated glass components to be received in the trays 21. In this case as well, the agglomerated glass components will not fall between the glass ribbon 8 which is being formed and the pulling rollers 9 to become sandwiched therebetween. Thereby, the occurrence of problems such as formation defects and cracks in the glass ribbon 8 can be positively prevented.

Note that in the present embodiment, the horizontally oriented trays 21 in which the agglomerated glass components are accumulated cannot be drawn out from the mount 41 in the horizontally oriented state. Therefore, when the agglomerated glass components which have accumulated in the trays 21 are to be removed, the mount 41 is moved to separate from the second peripheral walls 10, to take the trays 21 out from the interior of the second peripheral walls 10.

In the case that the trays are configured to be rotatable as in the second embodiment, non rotatable trays such as those provided in the apparatus of the first embodiment may be further provided between the rotatable trays and the pulling rollers thereunder. In this case, a cutout that communicates with the interior and the exterior of the second peripheral walls 10 may be formed in one of the second peripheral walls 10 at a position above the pulling rollers 9, and the non rotatable trays may enter the interior of the second peripheral walls 10 through the cutout. A tray holding mechanism having the basic configuration illustrated in FIG. 3 may be employed as the tray holding mechanism in such a case.

Further, the configuration in which non rotatable trays enter the interior of the second peripheral walls 10 through the cutout formed in a portion of the second peripheral walls 10 may be provided independently, without the rotatable trays.

Figure 7:
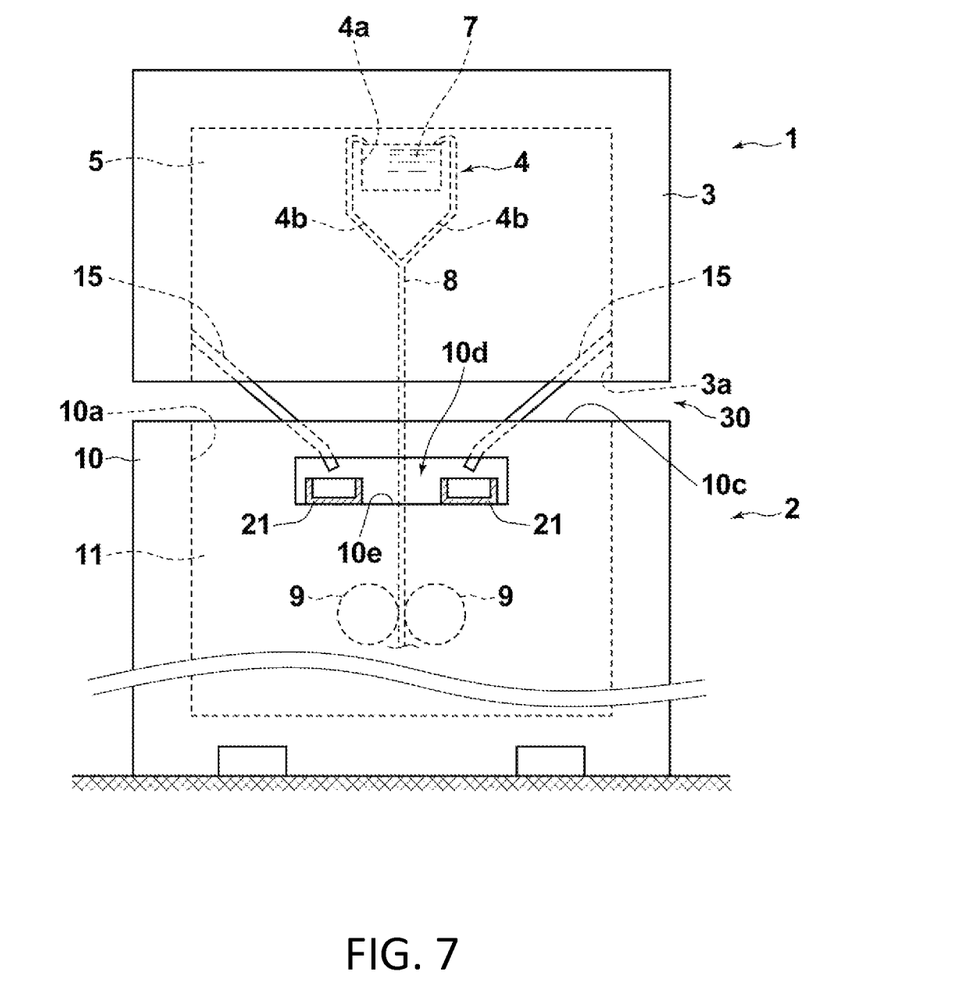
FIG. 7 is a partially cross sectional front view of a glass forming apparatus according to a third embodiment of the present invention.

FIG. 7 is a partially cross sectional front view of a still another glass forming apparatus having such a configuration. As illustrated in FIG. 7, a cutout 10d is formed in a portion of the second peripheral walls 10, and two trays 21 are inserted into the inner space 11 within the second peripheral walls 10 through the cutout 10d. The two trays 21 which are inserted in this manner are held on an upward facing surface 10e of the second peripheral walls 10, which is the bottom edge of the cutout 10d. That is, in the third embodiment, a portion of the second peripheral walls 10 that includes the surface 10e constitutes a tray holding mechanism.

Note that a holding member for receiving the leading ends of the trays 21 may be mounted on the inner surface of one of the second peripheral walls 10 opposite the wall through which the trays 21 are inserted. In addition, a tray holding mechanism may be provided separately from the peripheral walls 3 and 10, instead of the portion of the second peripheral walls 10 that includes the surface 10e holding the trays 21.

Embodiments of the glass forming apparatus have been described above. However, the present invention is not limited to the above embodiments, and various modifications are possible within a range that does not stray outside of the technical concept of the present invention.

What is claimed is:

1. A glass forming apparatus, comprising:
    first peripheral walls defining an inner forming space for forming molten glass into a glass ribbon by surrounding a lateral periphery of the inner forming space and having a lower opening at a lower end thereof;
    a forming body for causing the molten glass to flow downward to form the molten glass into the glass ribbon, provided within the inner forming space;

second peripheral walls provided under the first peripheral walls with an interval therebetween that define an inner forming space for receiving the glass ribbon by surrounding a lateral periphery of the inner forming space and having an upper opening through which the glass ribbon passes;

a pair of rollers provided within the second peripheral walls for pinching and drawing the glass ribbon downward;

partitioning plates having base ends fixed to inner surfaces of the first peripheral walls and distal ends positioned lower than the base ends, for adjusting a temperature within the inner forming space;

box shaped trays having open portions; and a tray holding mechanism that enables the trays to enter and exit the interval and that holds the trays such that they are positioned under the distal ends of the partitioning plates and extend along the distal ends when the trays are within the interval.

2. A glass forming apparatus as defined in claim 1, wherein the tray holding mechanism is constituted by portions that include surfaces of upper edges of the second peripheral walls.

3. A glass forming apparatus as defined in claim 1, wherein the trays have a U shaped cross section.

4. A glass forming apparatus as defined in claim 1, wherein a length of the open portions of the trays are greater than or equal to a width of the distal ends of the partitioning plates in a horizontal direction.

5. A glass forming apparatus as defined in claim 1, wherein:
the partitioning plates are formed in a state in which they extend in a width direction of the glass ribbon at both sides of the glass ribbon; and
two of the trays are provided, each tray corresponding to one of the partitioning plates.

6. A glass forming apparatus as defined in claim 1, wherein the glass forming apparatus is a fusion draw glass forming apparatus.

7. A glass forming apparatus, comprising:
first peripheral walls that define an inner forming space for forming molten glass into sheet form by surrounding a lateral periphery of the space and having a lower opening at a lower end thereof;

a forming body for causing the molten glass to flow downward to form the molten glass into a glass ribbon, provided within the inner forming space;

second peripheral walls provided under the first peripheral walls with an interval therebetween that define an inner forming space for receiving the glass ribbon by surrounding a lateral periphery of the inner forming space and having an upper opening through which the glass ribbon passes;

a pair of rollers provided within the second peripheral walls for pinching and drawing the glass ribbon downward;

partitioning plates having base ends fixed to inner surfaces of the first peripheral walls and distal ends positioned lower than the base ends, for adjusting a temperature within the inner forming space;

a cutout that communicates with an interior and an exterior of the second peripheral walls, the cutout formed in the second peripheral walls at positions above the pair of rollers;

box shaped trays having open portions; and a tray holding mechanism that enables the trays to enter and exit the second peripheral walls through the cutout in a state in which the open portions of the trays are oriented to face horizontal directions, that enables the trays to be rotated until the open portions are oriented to face upward after the trays enter the second peripheral walls, and that holds the trays such that they are positioned under the distal ends of the partitioning plates and extend along the distal ends after the rotation.

8. A glass forming apparatus as defined in claim 7, wherein the tray holding mechanism comprises:
rods, to which ends of the trays are fixed, the rods extending in a direction parallel to the distal ends of the partitioning plates; and a mount having portions that hold the rods in a rotatable manner and portions that extend in vertical directions with apertures through which the trays pass formed therein.

9. A glass forming apparatus as defined in claim 8, wherein the tray holding mechanism comprises handles for rotating the rods.

10. A glass forming apparatus as defined in claim 7, wherein the trays have a U shaped cross section.

11. A glass forming apparatus as defined in claim 7, wherein a length of the open portions of the trays are greater than or equal to a width of the distal ends of the partitioning plates in a horizontal direction.

12. A glass forming apparatus as defined in claim 7, wherein:
the partitioning plates are formed in a state in which they extend in a width direction of the glass ribbon at both sides of the glass ribbon; and
two of the trays are provided, each tray corresponding to one of the partitioning plates.

13. A glass forming apparatus as defined in claim 7, wherein the glass forming apparatus is a fusion draw glass forming apparatus.

14. A glass forming apparatus, comprising:
first peripheral walls that define an inner forming space for forming molten glass into a glass ribbon by surrounding a lateral periphery of the inner forming space and having a lower opening at a lower end thereof;

a forming body for causing the molten glass to flow downward to form the molten glass into the glass ribbon, provided within the inner forming space;

second peripheral walls provided under the first peripheral walls with an interval therebetween that define an inner forming space for receiving the glass ribbon by surrounding a lateral periphery of the inner forming space and having an upper opening through which the glass ribbon passes;

a pair of rollers provided within the second peripheral walls for pinching and drawing the glass ribbon downward;

partitioning plates having base ends fixed to inner surfaces of the first peripheral walls and distal ends positioned lower than the base ends, for adjusting a temperature within the inner forming space;

a cutout that communicates with an interior and an exterior of the second peripheral walls, the cutout formed in the second peripheral walls at positions above the pair of rollers;

box shaped trays having open portions; and a tray holding mechanism that enables the trays to enter and exit the second peripheral walls through the cutout, and holds the trays such that they are positioned under the distal ends of the partitioning plates and extend along the distal ends of the partitioning plates after a rotation of the trays.

15. A glass forming apparatus as defined in claim 14, wherein the tray holding mechanism comprises a portion that includes an upward facing surface of the second peripheral walls, which is a lower edge of the cutout.

16. A glass forming apparatus as defined in claim 14, wherein the trays have a U shaped cross section.

17. A glass forming apparatus as defined in claim 14, wherein a length of the open portions of the trays are greater than or equal to a width of the distal ends of the partitioning plates in a horizontal direction.

18. A glass forming apparatus as defined in claim 14, wherein:
- the partitioning plates are formed in a state in which they extend in a width direction of the glass ribbon at both sides of the glass ribbon; and
- two of the trays are provided, each tray corresponding to one of the partitioning plates.

19. A glass forming apparatus as defined in claim 14, wherein the glass forming apparatus is a fusion draw glass forming apparatus.

\* \* \* \* \*